United States Patent

Pringle

[15] 3,635,419
[45] Jan. 18, 1972

[54] AUTOMATIC LOCKING RETRACTOR

[72] Inventor: William L. Pringle, Grosse Pointe, Mich.

[73] Assignee: Jim Robbins Seat Belt Co., Clemens, Mich.

[22] Filed: Oct. 17, 1969

[21] Appl. No.: 867,194

Related U.S. Application Data

[63] Continuation-in-part of Ser. No. 724,687, Apr. 29, 1968, abandoned, Continuation-in-part of Ser. No. 771,159, Oct. 28, 1968, abandoned.

[52] U.S. Cl. ...................................................242/107.4
[51] Int. Cl. ...................................................B65h 75/48
[58] Field of Search ............242/107, 107 SB, 107.4, 107.5, 242/107.6; 297/388; 280/150 SB

[56] References Cited

UNITED STATES PATENTS

| | | | |
|---|---|---|---|
| 2,488,858 | 11/1949 | Franz | 297/388 |
| 3,482,799 | 12/1969 | Wrighton et al. | 242/107.4 |
| 2,845,234 | 7/1958 | Cushman et al. | 242/107.4 |
| 3,193,327 | 7/1965 | Roe | 297/388 |
| 3,348,789 | 10/1967 | Hirsch | 242/107.4 |
| 3,412,952 | 11/1968 | Wohlert et al. | 242/107.4 |
| 3,446,454 | 5/1969 | Kovacs et al. | 242/107.4 |
| 3,450,368 | 6/1969 | Glauser et al. | 242/107.4 |

*Primary Examiner*—Stanley N. Gilreath
*Assistant Examiner*—Werner H. Schroeder
*Attorney*—Barnard, McGlynn & Reising

[57] ABSTRACT

A retracting reel assembly including a support means with reel means rotatably supported by the support means for winding and unwinding an elongated flexible seat belt element thereonto and therefrom. The assembly also includes control means for controlling the rotation of the reel means which control means has a cam member rotatable about the axis of the reel means in response to rotation of the reel means. The cam member has a cam track at least a portion of which is in the form of a spiral and extends radially about the axis of rotation. A cam follower engages the cam track to be moved in a plane generally perpendicular to the axis.

3 Claims, 11 Drawing Figures

INVENTOR
WILLIAM L. PRINGLE

INVENTOR
WILLIAM L. PRINGLE

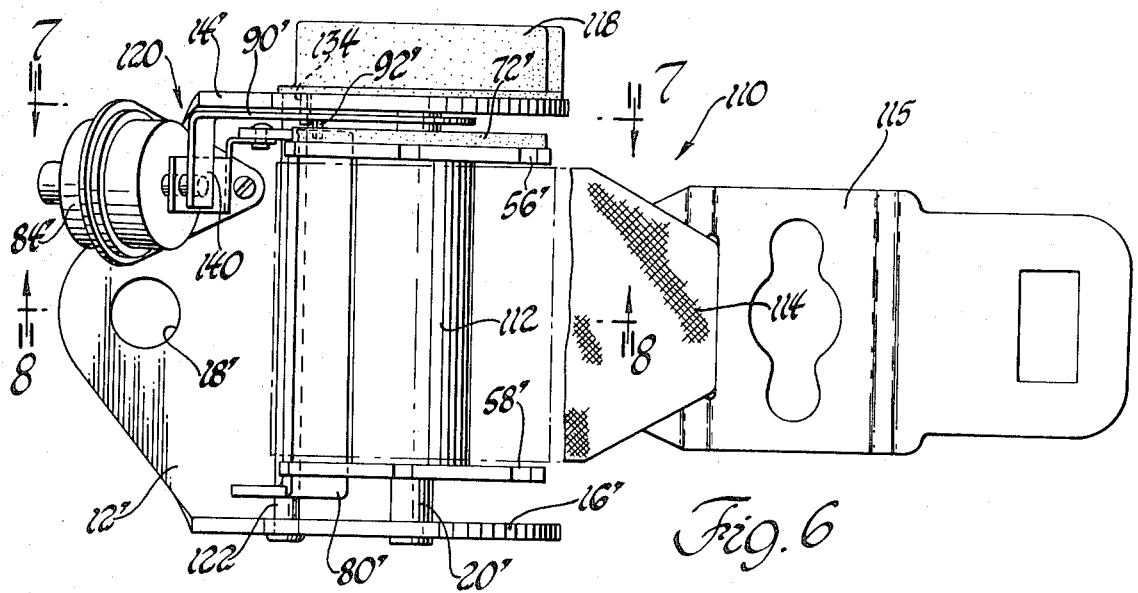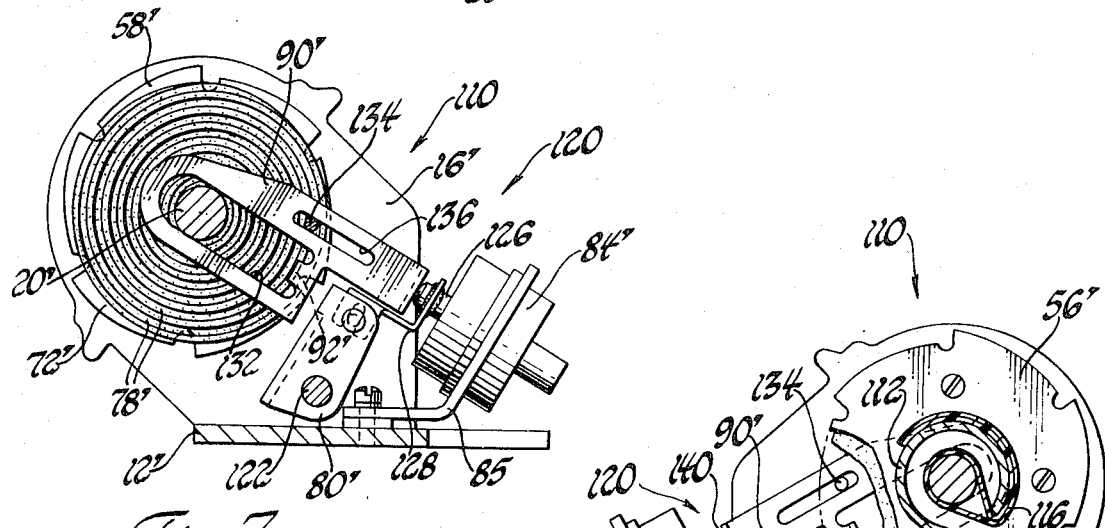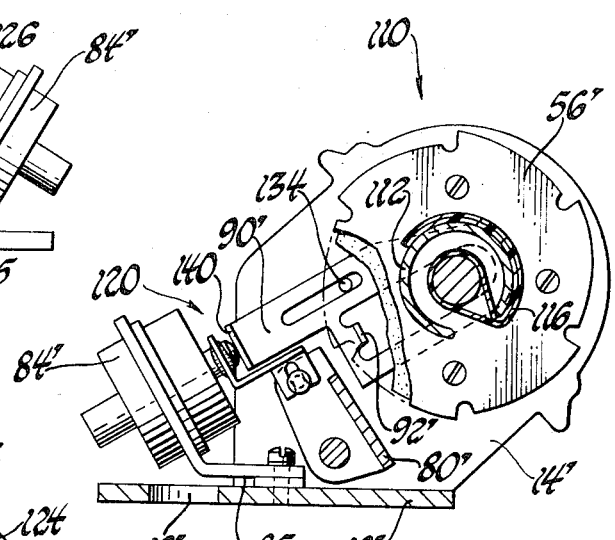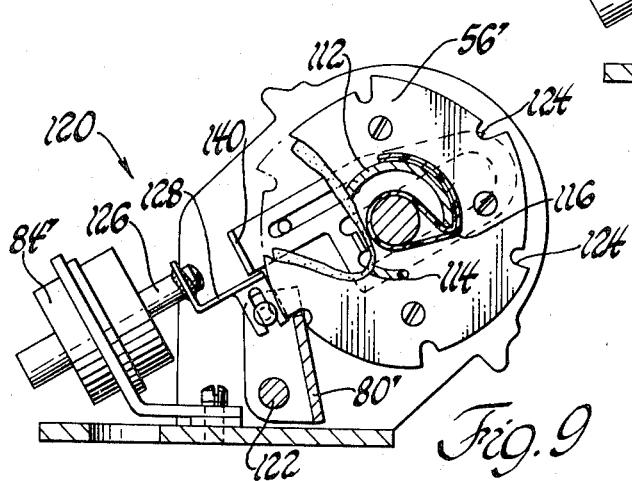

PATENTED JAN 18 1972          3,635,419

INVENTOR
WILLIAM L. PRINGLE
*Barnard, McGlynn & Reising*
ATTORNEYS

AUTOMATIC LOCKING RETRACTOR

CROSS-REFERENCE TO RELATED APPLICATIONS

This application is a continuation-in-part of application Ser. No. 724,687 filed Apr. 29, 1968, for "Automatic Locking Retractor with Cam Disabling Means," now abandoned, and Ser. No. 771,159 filed Oct. 28, 1968, for "Automatic Locking Retractor With Spiral Track" now abandoned.

BACKGROUND OF THE INVENTION

This invention relates to automatic locking seatbelt retractors and more specifically to such a retractor having means for automatically locking a reel on which the belt is wound against rotation in the direction in which the belt is unwound a predetermined time after the belt is initially extended from its fully retracted position.

Automatic locking retractors are known in the prior art which allow the user to freely extend the seatbelt from its fully retracted position to a partially extended position which accommodates the desires of the particular user, and then either lock the reel or otherwise prevent the belt from being further extended so that it functions as a body restraining element. Such automatic devices usually sense the motion or lack of motion of the reel or the belt, or respond to its presence as reflected in its size as it is wound on the reel, or include time delay means which are triggered upon the initial extension of the belt from its reel, or the like. Some examples of such prior art are shown in U.S. Pat. Nos. 3,174,704; 3,193,327; 3,289,946; 3,289,970; and 3,338,532. A major problem associated with such devices is to provide reliable means for automatically actuating the locking means after a selected portion of the belt has been extended and which become automatically unlocked as the belt is returned to its retracted position. For purposes of manufacturing, such a retracting device must be composed of a relatively few components, provide a high degree of reliability, and still have a compact overall size for purposes of appearance.

SUMMARY OF THE INVENTION

The preferred embodiment of the present invention, which will be subsequently described in greater detail, comprise a reel supported between the walls of a substantially channel-shaped support adapted to be attached to the vehicle. One end of a seatbelt is connected to the reel which is spring biased toward rotation in a retracting direction to wind the belt into a roll around the reel but which can be rotated in the opposite direction to unwind the belt from the roll.

A pair of circular ratchets are mounted on the reel, one between each side of the belt roll and the walls of the support. A locking pawl is mounted on the support for motion between a locked position in which it engages the ratchets to lock the reel against rotation in the direction which allows the belt to be extended, and an unlocked position in which it is spaced from the ratchets. A time delay actuator, also mounted on the support adjacent the unlocked position to the pawl, provides the means for moving the pawl from its unlocked toward its locked position.

A cam member having a track is attached on one of the ratchets with at least a portion of the track extending radially in a spiral from and being concentric with the axis of rotation of the reel. In one embodiment the track is formed completely in a spiral such that it extends around its center a greater number of revolutions than are necessary to rotate the reel between the fully retracted and fully extended positions of the belt. In a second embodiment the track includes two concentric portions with the spiral portion extending therebetween. A follower, engaged in the track, is operatively engageable with or connected to the pawl and moves in one direction as the reel is rotated in its belt-extending direction and in the opposite direction as the reel is rotated in its belt-retracting direction.

In the embodiment with the completely spiral track, the follower is operatively engageable with or connected to the pawl such that when the pawl is in its locked position and the reel is rotated in its retracting direction through a predetermined rotary position, the follower moves the pawl toward its unlocked position.

In the embodiment with the spiral portion extending between the concentric portions, the follower is operatively engageable with or connected to the pawl such that when the pawl is in its locked position and the reel is rotated in its retracting direction through a predetermined angular interval, the follower moves the pawl toward its unlocked position.

If the reel is rotated to its fully retracted position, the follower means moves the pawl a sufficient distance to engage and reset the timed delay actuator. As long as the reel is in its fully retracted position, the follower maintains the actuator in a disabled condition, that is so that it cannot move the pawl toward its locked position. As the reel is rotated in its extending direction by the user extending the belt from its fully retracted position, the follower is moved by the track to a position which allows the pawl freedom of movement from its unlocked position toward its locked position.

If the belt is extended from the reel for a predetermined time interval, a matter of seconds, the actuator moves the pawl into its locked position to prevent the belt from being further extended.

Thus, the follower and the track which includes at least a portion which is a spiral cooperate as the reel is rotated through a first predetermined position in the retracting direction to unlock the pawl, and in another predetermined rotary position of the reel, corresponding to the fully retracted condition of the belt, to maintain the pawl in its unlocked position.

In parent application Ser. No. 724,687 the reel-type retractor with the cam having an inner circular track, and an outer circular track connected by a spiral track was disclosed. This track arrangement is such that the follower moves the pawl from its locked position in response to the reel being rotated in the retracting direction through a predetermined angular interval. In parent application Ser. No. 771,159 the reel-type retractor with the completely spiral track is disclosed and the follower cooperates with the track to move the pawl from its locked position as the reel is rotated through a predetermined rotary position.

The retractor of the instant invention provides a number of advantages over prior art automatic retractors. For example, the retractor does not have to be fully retracted before the user can extend the belt after an initial extension.

Also, by providing a cam and follower coupling between the pawl and the ratchet that is responsive to rotation of the reel through a predetermined angular interval rather than motion or absence of motion of the belt, or the size of the belt, the preferred retractor is independent of variables associated with the belt. The cam and follower arrangement allows the user to unlock the reel for rotation in the unwind direction after any selected length of the belt has been unwound from the reel by merely partially retracting the belt a sufficient distance to move the follower between the circular grooves of the cam.

Advantages of the retractor embodying a cam with a totally spiral track are that it provides a quieter operation because the follower never reaches the end of the spiral track and the follower is always moved as the reel is rotated.

Still further objects and advantages of the present invention will readily occur to one skilled in the art to which the invention pertains upon reference to the following detailed description.

DESCRIPTION OF THE DRAWINGS

The description refers to the accompanying drawings in which like reference characters refer to like parts throughout the several views and in which:

FIG. 6 is a plan view of another preferred embodiment of the invention which also utilizes a totally spiral track but differs from the first embodiment in construction;

FIG. 7 is a cross-sectional view taken substantially along the line 7—7 of FIG. 6;

FIG. 8 is a partially broken away cross-sectional view taken substantially along line 8—8 of FIG. 6 and showing the locking pawl in the unlocked position;

FIG. 9 is a view similar to FIG. 8 but showing the locking pawl in the locked position;

DESCRIPTION

Figure 1:
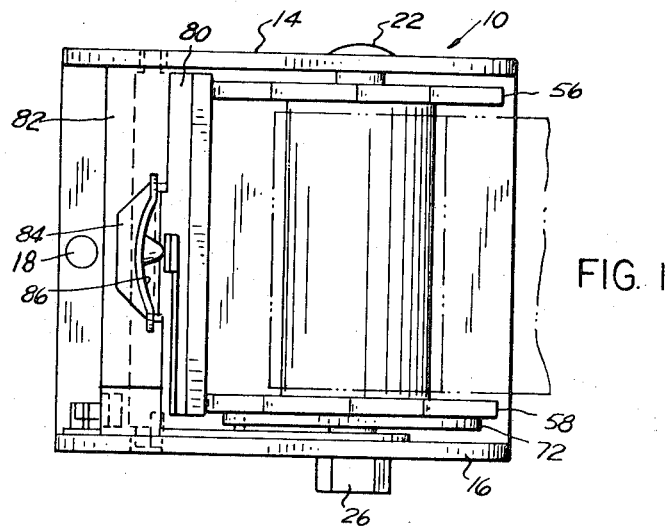
FIG. 1 is a plan view of an automatic locking retractor illustrating a preferred embodiment of the invention wherein the cam track is totally a spiral.

Now referring to the drawings, a preferred automatic locking retractor, generally indicated at 10, comprises a channel-shaped support means having a flat base 12 and a pair of spaced parallel sidewalls 14 and 16 fixed with respect to one another. The base 12 is apertured at 18 to provide means for a suitable fastener (not shown) to attach the support to a vehicle structure.

A windup reel means is supported between the walls 14 and 16 of the support for rotation in either belt-retracting or belt-extending directions. The reel means can take a variety of conventional configurations, but for purposes of description it includes an elongated anchor bolt or shaft 20 supported by the support walls 14 and 16. The head 22 of the bolt has a series of projections 24 which are engaged in suitable recesses (not shown) formed in the wall 14 so that when the bolt is mounted in place it is locked against rotation with respect to the support. A nut 26 is threadably mounted on the bolt with its ends in abutment with the opposed sides of the walls 14 and 16. A pair of plastic bushings 30 and 32 are mounted adjacent to the ends of sleeve 28. The bushing 30 has an inwardly directed keylike portion 34 which extends through a slot 36 formed adjacent the end of sleeve 28 and is seated in a keyway 38 formed in the bolt 20. Thus, the bushing 30 and the sleeve 36 are fixed with respect to the bolt 20. The bushing 32 is rotatable about the sleeve 28 and is connected by a helical spring 40 to the bushing 30. The ends of the spring 40 are received in apertures 42 and 44 of the bushings 30 and 32 so that as the bushing 32 is rotated in the belt-extending direction, the spring becomes tensioned so that it biases the bushing 32 in the opposite, belt-retracting direction.

A cylindrical member or drum 46 is mounted on the bushings 30 and 32. One end of the drum 46 has a pair of slots 48 mated with a pair of key portions 50 formed on the bushing 32 so that the drum 46 is rotatable with the bushing 32. The other end of the drum 46 is slidably mounted on the bushing 30 so that it is rotatable relative to the bushing 30. An elongated clip 52 having a longitudinal slot 54 provides means for clamping the end of a seatbelt 56 onto the drum 46. When assembled, the belt is looped around the drum 46 and then stitched to itself to form a permanent loop. The clip 52 then tightly clamps the looped end of the belt onto the drum. Thus, as the drum 46 is rotated in the retracting direction the belt is wound into a roll around the clip 52, and as the belt is extended from the retractor, it is unwound from the roll on the clip 52.

A pair of circular ratchet members 56 and 58 are mounted on the sleeve 28 adjacent the ends of the drum 46. Each ratchet has three arcuate slots 60, 62 and 64 which receive tabs 66, 68 and 70 formed on each end of the clip 52 so that both ratchets rotate with the clip 52 and the drum 46 as the belt is extended or retracted.

A flat cam 72 is attached to the ratchet 58 by means of a series of tabs 74 (only one of which is shown) received in a series of apertures 76 in the ratchet 58. The cam 72 has one side formed with a spiral track 78 with the center of the spiral coinciding with the axis of rotation of the drum 46. The spiral track extends radially about the axis of the bolt or shaft 20.

Figure 3:
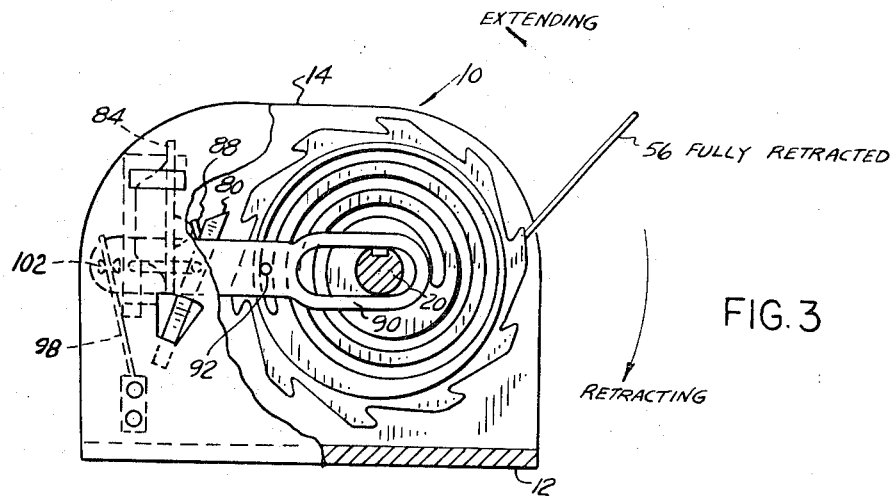
FIG. 3 is a sectional elevational view of the preferred retractor showing the follower adjacent one end of the spiral track.
Figure 2:
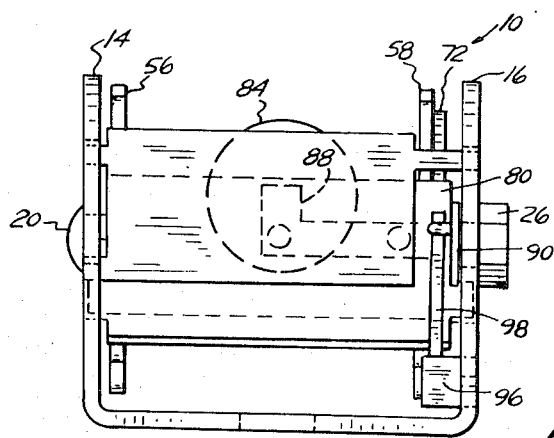
FIG. 2 is an end elevational view of the preferred retractor as seen from the left side of FIG. 1.
Figure 4:
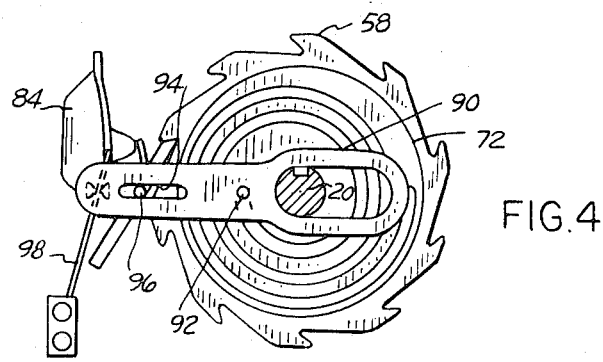
FIG. 4 is a view similar to FIG. 3, but showing the follower adjacent the opposite end of the track with the pawl free for movement toward its locking position.

A pawl 80 is supported for motion between the sidewalls 14 and 16 of the support between a locked position, illustrated in FIG. 4, in which the ratchets are locked against rotation in the extending direction, and an unlocked position, illustrated in FIG. 3, in which the pawl is separated from the ratchets. It is to be noted that the teeth of the ratchets are formed such that when engaged with the pawl, the ratchets are prevented from being rotated in the belt-extending direction, but can be rotated in the retracting direction under the influence of the spring 40.

A support 82 mounted between the sidewalls 14 and 16 adjacent the unlocked position of the pawl 80 provides means for mounting a time delay actuator 84. The actuator 84 may take any of several conventional forms but is preferably of an air bleed type having a resilient wall 86 formed with a small air bleed hole and a one-way check or flow valve (not shown). The wall 86 has a depressed position, shown in FIG. 1, and an expanded position, illustrated in FIG. 4. When the wall 86 is depressed to force air out of the air bleed hole and the check valve, and then released, air gradually bleeds into the actuator only through the air bleed hole until the wall snaps into its expanded position a predetermined time after the depressing force has been released. Thus, the actuator 84 includes an expandable fluid chamber with means for controlling the flow of fluid into and out of the chamber.

A release arm 88, carried on the back of the pawl 80, engages the center of the wall 86 of the actuator so as to depress the wall as the pawl is returned to its unlocked position. As the wall 86 expands and snaps to its expanded position, it pushes the release arm 88 and the pawl toward its locked position in which it is engaged with the teeth of the ratchets.

An elongated follower member 90 connects the cam 72 and the pawl 80. The follower member has a tab or cam follower 92 slidably disposed in the spiral track 78 so that as the cam member is rotated with the ratchet 58 in the belt-extending direction, the follower 90 is moved toward the right as viewed in FIG. 3, and away from the pawl. Similarly, when the cam is rotated in the opposite direction, the follower 90 is moved by the spiral track toward the left and the pawl.

The follower 90 has an elongated slot 94. A tab 96 carried by the release arm 88 on the pawl is disposed in the slot 94. As the follower 90 is moved toward the pawl, the end of the slot 94 approaches the tab 96 and in a predetermined rotary position of the cam 72 commences to move the pawl from its locked position toward its unlocked position. If the retracting motion is continued until the belt is fully retracted, the follower 90 moves the pawl 80 to its fully unlocked position as the cam approaches a second predetermined rotary position associated with the fully retracted condition of the belt. As the cam approaches this second predetermined position, the release arm depresses the wall 86 of the actuator to reset the actuator for a subsequent extension of the belt. When the follower has returned the pawl 80 to its unlocked position, the actuator is maintained in its depressed or set position until the reel is again rotated in its belt-extending direction. The follower then commences to move toward the right with the end of the slot 94 separating from the tab 96. As the belt is extended toward a partially or fully extended position, the follower is moved until the slot 94 is in a position that allows the pawl 80 sufficient freedom of motion that it can be moved from its unlocked position to its locked position. A predetermined time after this initial extension of the belt, the actuator 84 expands and moves the pawl into its fully locked position so that the belt cannot be further extended unless it is returned to its fully retracted position.

An overcenter return spring 98 is included and has one end anchored to the sidewall 16 and its other end connected to the follower at 102. The follower acts as a disabling means, that is, it prevents the pawl 80 from being moved toward its locked position until the reel has been rotated in the belt-extending direction to a predetermined position. When in its disabling position the follower 90 is biased by the spring 98 away from its disabling position. Similarly, when the pawl is in its extreme position toward the right, the return spring 98 biases the follower toward its disabling position.

Referring now to FIGS. 6 through 9, there is generally shown at 110 another preferred embodiment of the automatic locking actuator or retracting reel assembly. Numbers with a prime are utilized in identifying elements in FIGS. 6 through 9 which correspond to like elements with like numbers in FIGS. 1 through 5. The retracting reel assembly 110 includes a channel-shaped support means having a flat base 12' and a pair of spaced parallel sidewalls 14' and 16' extending upwardly from the base 12'. The base 12' is apertured at 18' to provide means for attaching the support means to a vehicle structure.

The reel means comprises a cylindrical member 112 which has a slot 114 extending therealong. Circular ratchet members 56' and 48' are secured to the ends of the cylindrical member 112. The ratchet members 56' and 58' are secured to the shaft 20' and the shaft 20' is rotatably supported in the walls 14' and 16'.

An elongated flexible element or seatbelt 114 is looped about the shaft 20' and extends through the slot 114 to be wound about the cylindrical member 112. A platelike tongue member 115 is secured to the end of the seatbelt 114 and is adapted for locking engagement with a buckle (not shown).

Disposed within the housing 118 is a spiraled type spring having one end secured to the wall 14' and the other end secured to the shaft 20'. The shaft 20' is rotatably supported in the walls 14' and 16' and extends through the wall 14'. The spiral spring within the housing 118 is, therefore, a bias means for urging the reel means to rotate in the direction to wind the seatbelt 114 about the cylindrical member 112. A spiral spring of the type utilized within the housing 118 is well known in the art, a sample of such being disclosed in copending application Ser. No. 767,110 filed Oct. 14, 1968.

The assembly 110, like the previously described assembly 10, includes a control means generally indicated at 120 for controlling the rotation of the reel means. The control means 120 includes a cam member 72' which is rotatable with the ratchet member 56' about the axis of the shaft 20'. The cam member 72' is attached to the ratchet member 56' and is, therefore, rotatable in response to rotation of the reel means. The cam member 72' includes a spiral track 78' extending radially about the axis of rotation of the shaft 20'. In other words, the spiral track 78' is substantially in a plane perpendicular to the axis of the shaft 20'. A cam follower 92' engages the track 78' so as to be moved in a plane generally perpendicular to the axis of the shaft 20'. More specifically, the cam follower 92' moves in a direction which is radial to the axis of rotation of the shaft 20'.

The control means 120 also includes a locking means defined by the locking pawl 80'. The locking pawl 80' is rotatably supported by the support means through a pin 122, the locking pawl 80' being an elongated flat platelike member with flanged portions at each end through which the shaft 122 extends. The locking pawl 80' is movable between locked and unlocked positions for respectively preventing and allowing rotation of the reel means, the unlocked position being shown in FIG. 7 and the locked position being shown in FIG. 9. In the locked position, the locking pawl 80' engages the ratchet teeth 124 disposed about the circumference of the ratchet members 56' and 58'.

There is also included operative means operatively interconnecting the cam follower 92' and the locking pawl 80' for controlling the position of the locking pawl 80' in response to the position of the cam follower 92'. More specifically, the operative means includes an actuator means 84' for moving the locking pawl 80' from the unlocked position shown in FIGS. 7 and 8 after a delay from the initial unwinding of the belt 114 from the reel means. The actuator means 84' includes a housing defining an expandable fluid chamber with means for controlling the flow of fluid into and out of the chamber, such as an air bleed hole and a one-way check valve. The expandable chamber is in part defined by a piston coacting with a cavity so as to be movably disposed therein. The piston 126 is operatively attached to the locking pawl 80' through the bracket 128 and the pin 130, the pin 130 being secured to the locking pawl 80' and disposed within a forklike extension from the bracket 128. The actuator means 84' is attached to the base 12 of the support means through a bracket 85.

The operative means also includes the follower member 90' which is slidably supported on the shaft 20' and supports the cam follower 92' so as to be moved thereby. More specifically, the cam follower 92' is defined by a tab or bent out portion extending from the follower member 90'.

The follower member 90' has an elongated opening 132 therein and the shaft 20' extends through the opening 132 whereby the follower member 90' is slidably supported by the shaft 20'. A guide pin 134 extends from the wall 14' and is disposed in an elongated slot 136 for limiting movement of the follower member 90' to rectilinear or radial movement. The distal or outward end of the follower member 90' has a flange portion 140 which abuttingly engages or is engageable with the outward end of the piston 126.

Initially, the assembly is in the condition illustrated in FIG. 6 with the locking pawl 80' in the unlocked position. Upon extension or unwinding of the seatbelt 114 from the reel means, the cam follower 92' moves radially inwardly toward the axis of rotation of the shaft 20' to rectilinearly move the follower member 90' whereby the flange 140 thereof moves away from abutting engagement with the piston 126. The piston 126 is biased, as by springs or the like, to move outwardly very slowly as air is bled into the expandable fluid chamber of the actuator means 84'. Thus, the user may fully extend the seatbelt and move it back and forth during the buckling operation in the time interval before the piston 126 moves sufficiently outwardly that the locking pawl 80' is in the locked position engaging the ratchet teeth 124 of the ratchet members 56' and 58'. Once the tongue 115 is released from a buckle the reel means is rotated by the spring within the housing 118 in a winding direction whereby the cam follower 92' is moved radially outwardly relative to the axis of the shaft 20' thereby to move the follower member 90' to force the piston 126 into the housing. During the movement of the piston 126 inwardly a one-way check valve opens to allow rapid exhaust of the air trapped within the chamber in which the piston 126 is movably disposed.

Figure 11:
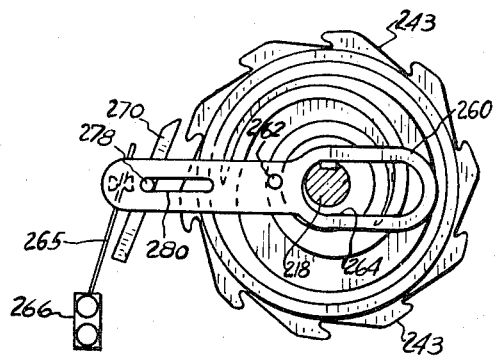
FIG. 11 is a cross-sectional view of the embodiment of FIG. 10 and showing the locking pawl free to move to the locked position.
Figure 10:
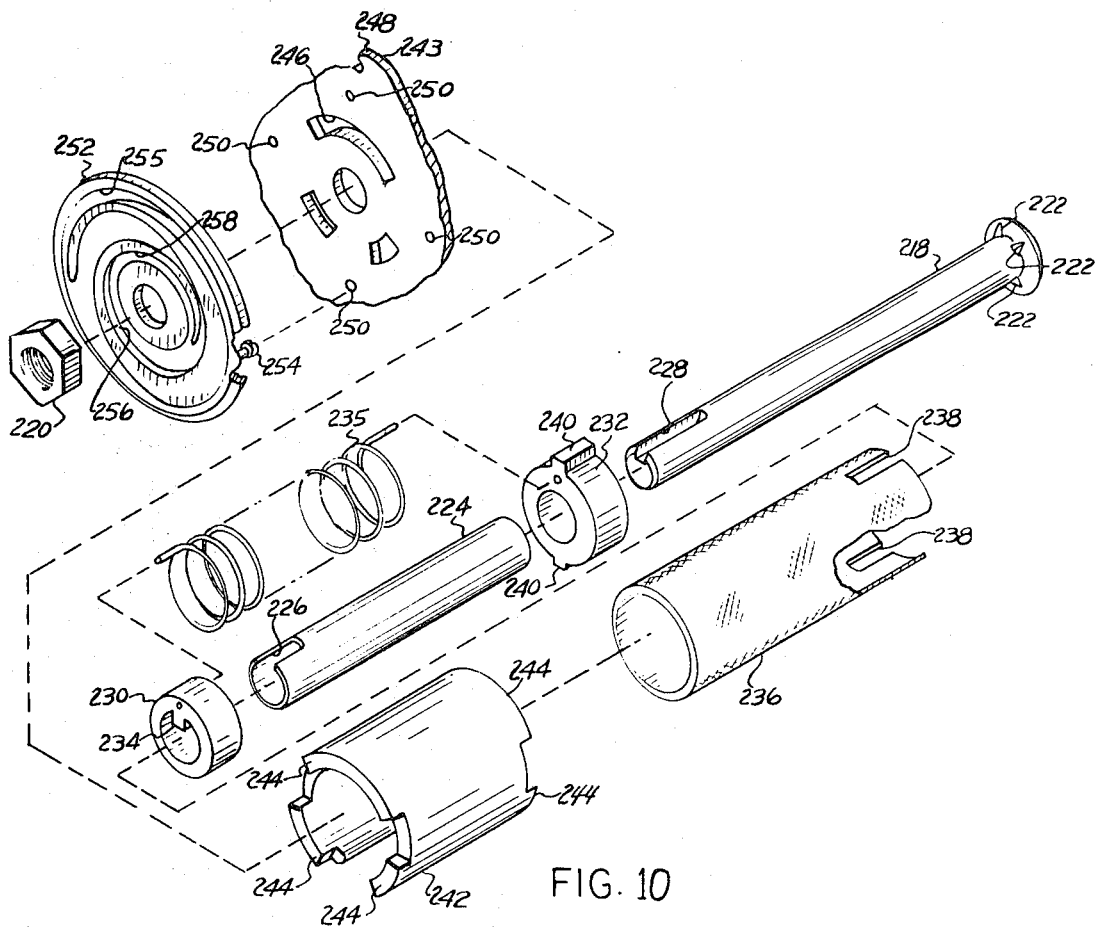
FIG. 10 is an exploded view of another preferred embodiment of the invention wherein the track includes two concentric circles interconnected by a spiral portion.

Now referring to the embodiment of FIGS. 10 and 11, there is disclosed an automatic locking retractor including the same elements as the embodiment of FIGS. 1 through 5 except for the cam member.

Figure 5:
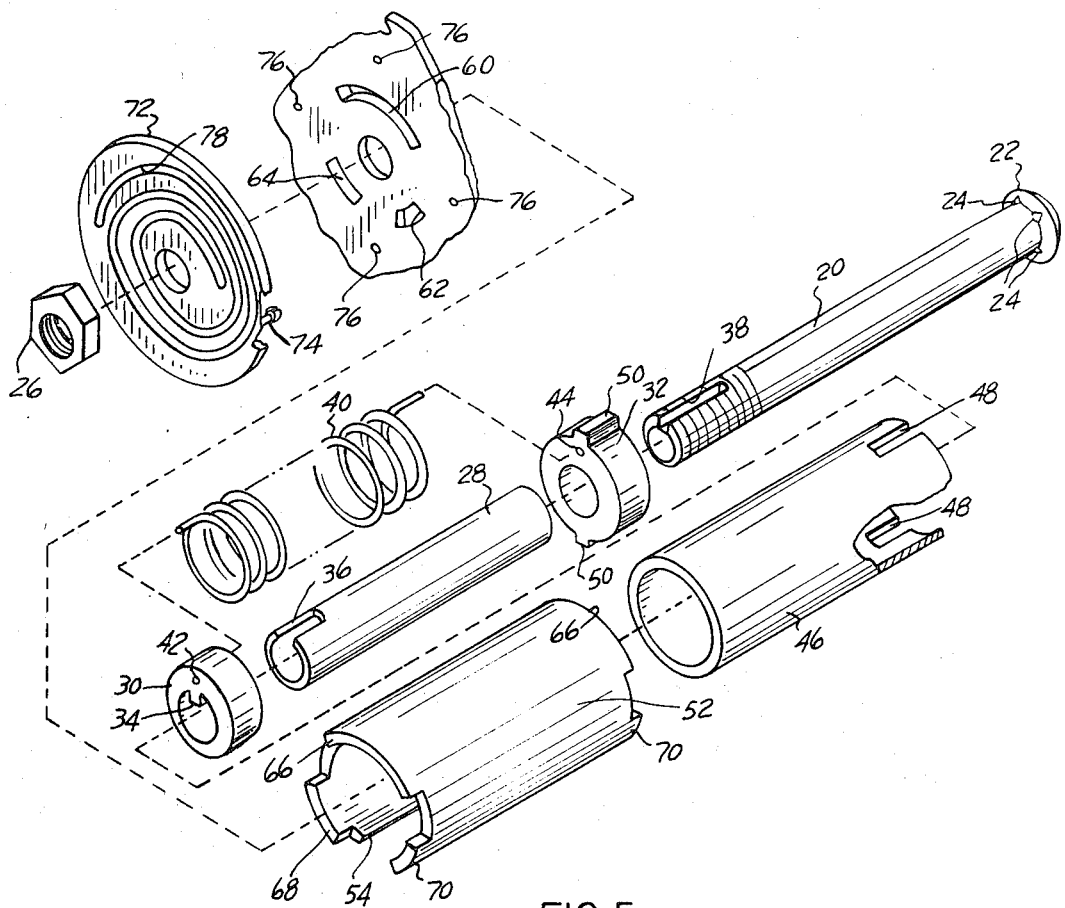
FIG. 5 is an exploded view of the components of the preferred retractor of FIG. 1.

The reel includes an elongated bolt 218 which is mounted on the sidewalls of the support and secured in place by a nut 220 in a manner like the bolt 20 of FIG. 5. The bolt 218 has a series of protrusions 222 under its head which seat in complementary formed recesses (not shown) in the sidewall of the support as in the embodiment of FIG. 5.

A spacer tube 224 is mounted on the bolt 218 with its opposite ends in abutment with the sidewalls of the support. The tube 224 has a slot 226 which is aligned with a keyway 228 in the bolt 218.

A pair of plastic bushings 230 and 232 are mounted on the spacer tube 224. The bushing 230 has an internal key portion 234 which is received by the slot 226 and seated in the keyway 228 so that it is locked against rotation. The second bushing 232 is rotatably mounted on the spacer tube 224. A windup spring 235 connects the two bushings and is arranged to be tensioned when the bushing 232 is rotated relative to the bushing 230.

The bushings 230 and 232 are disposed within a tube 236 which preferably has a milled surface and has a pair of slots 238 which engage a pair of keylike portions 240 of the bushing 232. Thus the tube 236 rotates relative to the fixed bushing 230 and with the bushing 232. A seatbelt is looped around the tube 236, stitched in place and then clamped on the tube 236 by a clip 242. The spring 235 is normally pretensioned so that when the user releases his grasp from the extended end of the belt, the bushing 232 and the tube 236, under the influence of the spring 235, rotate and thereby wind the seatbelt into a roll.

A pair of ratchet members 243 (only one shown) are fixedly attached to the clip 242 by lugs 244 on each end of the clip 242 which are engaged in a series of slots 246 in the ratchets. Each ratchet member has a series of inclined teeth 248 formed around its circumferential edge.

The shown ratchet member 243 has a series of apertures 250. A platelike cam member 252 is fixedly mounted on the ratchet member 243 by a series of slotted lugs 254 which snap into the holes 250 of the ratchet member so that the cam member 252 rotates with the ratchet member and the reel.

The difference in this embodiment and the previous embodiments is that this embodiment includes the cam member 252 with a series of cam grooves formed in its outer face including an outer circular groove 255, and an inner circular groove 256 which is concentric with the outer groove 255. Both the grooves 255 and 256 are formed about the axis of rotation of the cam member 252 and are connected by a spiral intermediate groove 258.

An elongated follower member 260 has a follower pin 262 riding in the grooves. The follower member 260 has an opening 264 through which an anchor bolt 218 passes and is movable between a pair of lateral positions with respect to the axis of rotation of the cam member 252. The lateral positions depend on the position of the follower pin 262 in the grooves so that in one of its positions, the pin 262 rides in the outer groove 254. The alternate position of the follower is shown in FIG. 11 in which the pin 262 rides in the inner groove 256. The particular groove in which the pin 262 rides depends on the direction of rotation of the reel means.

An overcenter leaf spring 265 is fastened by means 266 to the sidewall of the support with a free end slidably engaged between a pair of protrusions carried on the end of the follower 260 so as to urge the follower 260 toward or away from the axis of rotation of the reel depending on the groove in which the pin 262 is disposed. Thus if the pin 262 is in the outer groove 255, the spring 265 urges the follower 260 toward the inner groove 258. Similarly, as can be seen in FIG. 11, when the follower 260 is in the inner groove 258, the spring 265 biases the follower 260 toward the outer groove 255. Thus the position of the follower 260 depends on the direction of rotation of the cam member 252. Assuming the follower pin 262 is in the outer groove, and the reel is rotated in the wind direction or clockwise, the follower member will continue to remain in the outer groove 255. However, if the reel is rotated in the unwind direction or counterclockwise, the pin 262, under the influence of the spring 265, will enter the spiral groove 258 and ride in the spiral groove until it exits into the inner groove 256.

Similarly assuming the follower pin 262 is in the inner groove as viewed in FIG. 11, and the reel is rotated in the wind direction, the follower pin will enter the spiral groove 258 and move the follower 260 toward the left as it rides toward the outer groove 254. If the follower pin is in the outer groove 255 and the reel is rotated in the unwind direction, it can be seen that the pin 262 cannot enter the intermediate groove 258 but will continue to ride in the outer groove until the direction of rotation of the reel is reversed.

A platelike pawl member 270 is mounted in the same manner as the pawl 80 of FIGS. 1 through 5 and carries a pin 278 which is disposed in a slot 280 of the follower 260. The embodiment of FIGS. 10 and 11 also includes a time delay as in the previously described embodiments.

In operation of the embodiment of FIGS. 10 and 11, assuming the seatbelt is connected to the reel means, release of the seatbelt by the user allows the reel means to rotate in the wind direction and retract the belt so that it is wound around the reel means. When the reel means has either fully or partially retracted the belt from the reel means, the follower pin 262 will be in the outer groove 255 with the follower 260 acting as disabling means for the pawl 270, that is to say that it acts as a strut to prevent the pawl 270 from moving in locking engagement with the ratchet member 243. When the follower pin 262 is in the outer groove, the time delay means (not shown) is depressed into its initial condition. Rotation of the reel means in the unwind direction through an angular interval sufficient to allow the follower pin 262 to enter the spiral intermediate groove 258 and travel toward the inner groove moves the follower 260 to move toward its alternate position so that the pawl 270 is free to move under the control of the time delay means. After motion of the reel means in the unwind direction, the time delay means commences to expand until it snaps the pawl 270 into locking engagement with the ratchet member. This allows the user to extend any selected amount of belt from the reel that is necessary to couple the belt to his body. Normally the belt is initially overextended so that the buckle member on the end of the belt can be fastened to a complementary buckle member carried by a second belt section and then the two belts released so that the belt is partially retracted as it embraces the body of the user. The spiral intermediate groove 258 is formed of a suitable configuration so that the pawl 270 is not disengaged from the ratchet until the reel is rotated a predetermined angular interval in the wind direction after an initial rotation in the unwind direction. Rotation of the reel through an angular interval that is less than the predetermined angular interval will not disengage the pawl 270 from the ratchet member. This allows the user a limited degree of motion that will not unlock the retractor while restrained by the seatbelt. On the other hand it enables the time delay means to be present and the pawl 270 to be disengaged from the ratchet member by a partial rewind of the reel means rather than a full rewind.

The embodiment illustrated in FIGS. 1 through 5 formed the basis of parent application Ser. No. 771,159, the embodiment of FIGS. 10 and 11 formed the basis of parent application Ser. No. 724,687, and the embodiment of FIGS. 6 through 9 is new to this application.

This application, therefore, discloses and claims embodiments of a retracting reel assembly including support means with reel means rotatably supported by the support means and an elongated flexible seatbelt element connected to and wound about the reel means. It also includes locking means movable between locked and unlocked positions for respectively preventing and allowing rotation of the reel means and lock disabling means responsive to the rotation of the reel means for allowing the locking means to move to the locked position only after a predetermined degree of rotation of the reel means during the unwinding of the seatbelt therefrom and for moving the locking means from the locked position toward the unlocked position during the winding of the seatbelt on the reel means. In all embodiments, the lock-disabling means is a control means for controlling the rotation of the reel means and includes a cam member rotatable about an axis in response to rotation of the reel means and having a track with a spiral portion extending radially about the axis and a cam follower engaging the track to be moved in a plane generally perpendicular to the axis of rotation.

The advantages of the retractor with the cam having concentric portions interconnected by a spiral portion is that it can be easily designed for long or short programmed lengths of belt and has overtravel in both directions. The advantages of the retractor with the cam having a totally spiral track is that the cam follower always moves at a definite rate of travel in a radial direction and the length of belt extended for a given movement is always the same.

Thus, it is to be understood that I have described an improved automatic locking retractor having a relatively few components mounted between the walls of the support so that the overall assembly is relatively compact. This compactness is achieved by the relatively flat cam member that occupies a minimum of space between one ratchet member and the adjacent sidewall of the support means. The follower member is slidably mounted between the cam member and the sidewall to provide both reliable and quiet operation as it is moved by the cam member to either unlock the pawl, or allow it freedom of motion from its fully unlocked position.

The embodiments of the invention in which an exclusive property or privilege is claimed are defined as follows:

1. A seatbelt system comprising: a support; a reel journaled on the support for rotation in either a first, belt-retracting direction or in the opposite, belt-extending direction, said reel including spaced circular ratchet members; and elongated seatbelt having one end connected to the reel such that it is retracted with respect to the support as the reel is rotated in its first direction, and is allowed to extend as the reel is rotated in the opposite direction; bias means yieldingly urging the reel toward rotation in the retracting direction; a cam mounted on the support, and formed with a spiral track; a follower engaged in the spiral track so as to be moved between a pair of positions with respect to the track as the reel is rotated between a first predetermined rotary position and a second predetermined rotary position; a locking member supported for movement between a locked position in which it is operable to prevent the reel from being rotated, and an unlocked position in which it is inoperable to prevent the reel from being rotated; and lock-disabling means connected to the follower, and operable to move the locking member toward its unlocked position as the reel is rotated in its retracting direction toward its first predetermined position.

2. A seatbelt system as defined in claim 1, in which said lock disabling means is operable to prevent the locking member from being moved towards its locked position from its unlocked position as the reel is rotated in its extending direction unless the belt is at least partially extended from the reel.

3. A seatbelt system as defined in claim 2, including actuator means operable to move the locking member toward its locked position from its unlocked position a predetermined time after the reel is rotated in its extending direction from its first predetermined rotary position.

* * * * *